(12) United States Patent
Li et al.

(10) Patent No.: US 11,301,755 B2
(45) Date of Patent: Apr. 12, 2022

(54) METHODS, COMPUTING DEVICES, AND STORAGE MEDIA FOR PREDICTING TRAFFIC MATRIX

(71) Applicant: Tsinghua University, Beijing (CN)

(72) Inventors: Dan Li, Beijing (CN); Kaihui Gao, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 29 days.

(21) Appl. No.: 17/088,258

(22) Filed: Nov. 3, 2020

(65) Prior Publication Data
US 2021/0133569 A1 May 6, 2021

(30) Foreign Application Priority Data
Nov. 4, 2019 (CN) .......................... 201911066121.5

(51) Int. Cl.
| | |
|---|---|
| *G06N 3/08* | (2006.01) |
| *H04L 12/24* | (2006.01) |
| *G06N 3/04* | (2006.01) |
| *H04L 41/142* | (2022.01) |
| *H04L 41/147* | (2022.01) |

(52) U.S. Cl.
CPC ............... *G06N 3/08* (2013.01); *G06N 3/04* (2013.01); *H04L 41/142* (2013.01); *H04L 41/147* (2013.01)

(58) Field of Classification Search
None
See application file for complete search history.

(56) References Cited

U.S. PATENT DOCUMENTS

| 7,152,051 B1* | 12/2006 | Commons | ................ | G06N 3/08 |
| | | | | 706/16 |
| 2012/0020216 A1* | 1/2012 | Vashist | .................. | H04L 41/14 |
| | | | | 370/235 |
| 2018/0300608 A1* | 10/2018 | Sevrens | ................ | G06N 3/084 |

(Continued)

FOREIGN PATENT DOCUMENTS

CN        109242049        1/2019

OTHER PUBLICATIONS

Arbel ("Attention in RNNs") (Year: 2019).*

(Continued)

*Primary Examiner* — Alexey Shmatov
*Assistant Examiner* — Beatriz Ramirez Bravo
(74) *Attorney, Agent, or Firm* — Hodgson Russ LLP

(57) ABSTRACT

The disclosure provides a method for predicting a traffic matrix, a computing device, and a storage medium. The method includes: establishing a dataset based on continuous historical traffic matrices; and inputting one or more historical traffic matrices in the dataset into a trained model for predicting traffic matrices, to obtain one or more predicted traffic matrices. The trained model for predicting traffic matrices is obtained by the following actions: establishing a model for predicting traffic matrices based on a correlation-modeling neural network and a temporal-modeling neural network; and training the model for predicting traffic matrices based on a set of training samples, in which the set of training samples includes sample traffic matrices and label traffic matrices corresponding to the sample traffic matrices at prediction moment samples.

11 Claims, 6 Drawing Sheets

(56) References Cited

U.S. PATENT DOCUMENTS

2020/0135227 A1* 4/2020 Sainath ............... G06N 3/0445
2020/0379461 A1* 12/2020 Singh .................. G05D 1/0088
2021/0056413 A1* 2/2021 Cheung ................... G06N 3/08

OTHER PUBLICATIONS

Jordan ("Neural networks: training with backpropagation") (Year: 2017).*
Mei et al., "Coherent Dialogue with Attention-Based Language Models", Proceedings of the Thirty-First Conference on Artificial Intelligence (AAAI-17), disclosing an attention-RNN model that dynamically increases the scope of attention on the history as opposed to standard attention models. (Year: 2017).*
Zhang et al., "AT-LSTM: An Attention-based LSTM Model for Financial Time Series Prediction", IOP Conf. Series: Materials Science and Engineering 569 (Aug. 2019). (Year: 2019).*
Huang et al., "A Study of Deep Learning Networks on Mobile Traffic Forecasting," 2017 IEEE 28th Annual International Symposium on Personal, Indoor, and Mobile Radio Communications (PIMRC), 6 pages.
SIPO, First Office Action for CN Application No. 201911066121.5, dated Sep. 30, 2020.

* cited by examiner

METHODS, COMPUTING DEVICES, AND STORAGE MEDIA FOR PREDICTING TRAFFIC MATRIX

CROSS-REFERENCE TO RELATED APPLICATION

This application claims priority to Chinese Patent Application No. 201911066121.5, filed on Nov. 4, 2019, the entire contents of which are incorporated herein by reference.

FIELD

The disclosure relates to the field of computer technologies, and more particularly, to a method for predicting a traffic matrix, a computing device, and a storage medium.

BACKGROUND

Traffic matrix (TM) depicts traffic demands of all pairs of source and destination nodes for a period of time. It is a time series prediction task for predicting a traffic matrix, i.e., a traffic matrix for a period of time in the future is predicted by utilizing one or more historical traffic matrices collected. It has a great significance to many network tasks that the traffic matrix is predicted accurately, such as resource allocation, traffic engineering, and congestion mitigation.

SUMMARY

In a first aspect, embodiments of the disclosure provide a method for predicting a traffic matrix. The method includes: establishing a dataset based on continuous historical traffic matrices; and inputting one or more historical traffic matrices in the dataset into a trained model for predicting traffic matrices, to obtain one or more predicted traffic matrices.

The trained model for predicting traffic matrices is obtained by the following actions: establishing a model for predicting traffic matrices based on a correlation-modeling neural network and a temporal-modeling neural network; and training the model for predicting traffic matrices based on a set of training samples, in which the set of training samples includes sample traffic matrices and label traffic matrices corresponding to the sample traffic matrices at prediction moment samples.

In a second aspect, embodiments of the disclosure provide a computing device. The computing device includes: a storage medium; a processor; and a computer program stored on the storage medium and capable of running on the processor. The processor is configured to execute the computer program to implement actions of the method for predicting the traffic matrix.

In a third aspect, embodiments of the disclosure provide a non-transitory computer-readable storage medium. The non-transitory computer-readable storage medium has stored computer instructions that are executed by a processor to cause the processor to implement actions of the method for predicting the traffic matrix.

BRIEF DESCRIPTION OF THE DRAWINGS

In order to clearly illustrate embodiments of the disclosure or technical solutions in the related art, a brief description of drawings used in embodiments or in the related art descriptions is given below. Obviously, the drawings in the following descriptions are only part embodiments of the disclosure, and for those skilled in the art, other drawings can be obtained according to these drawings without creative labor.

DETAILED DESCRIPTION

In order to make objectives, technical solutions, and advantages of embodiments of the disclosure clearer, the technical solutions of the embodiments of the disclosure will be described clearly and completely in conjunction with the accompanying drawings of the embodiments of the disclosure. Obviously, the described embodiments are part embodiments of the disclosure, but not all the embodiments. Based on the embodiments of the disclosure, all other embodiments obtained by those of ordinary skill in the art without creative work shall fall within the protection scope of the disclosure.

Traffic demands of all pairs of source and destination nodes for a period of time may be depicted by a traffic matrix (TM). In an actual process, when a plurality of nodes sends flows to the same node, this node becomes a hotspot. Due to a bandwidth limitation (a sum of these flow rates cannot exceed a bandwidth at the same time), there may be a negative correlation among these flows. On the other hand, there may be a positive correlation with each other among a plurality of response flows returned from the hotspot (the response content is similar). An amount of traffic on one flow for the period of time is depicted as an element of the traffic matrix.

Figure 1:
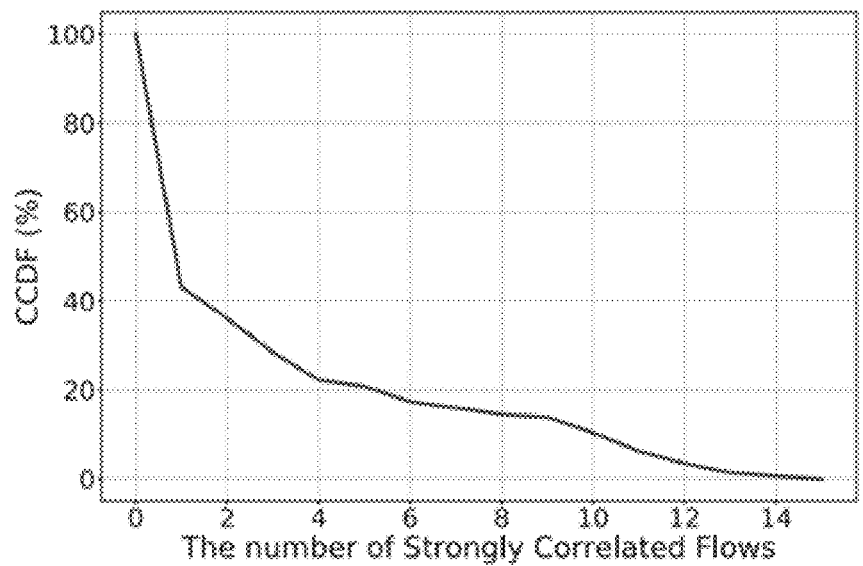
FIG. 1 is a schematic diagram of quantitative analysis on flow correlation based on dataset Abilene.
Figure 2:
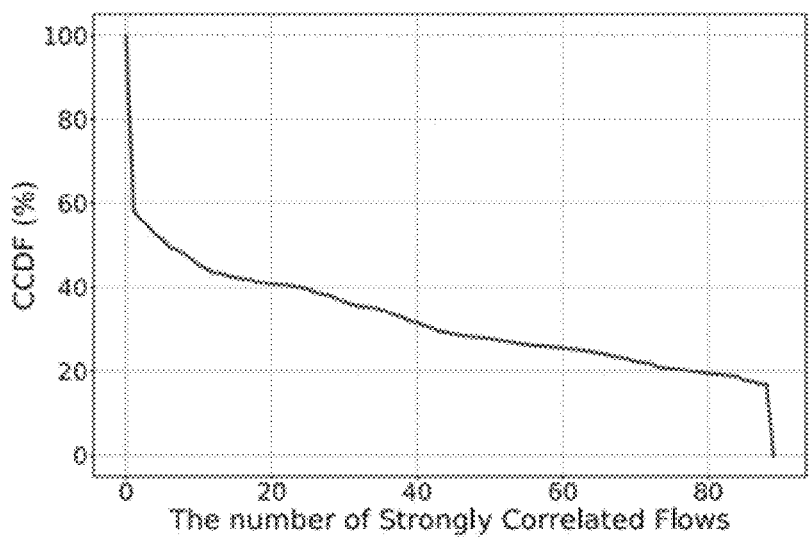
FIG. 2 is a schematic diagram of quantitative analysis on flow correlation based on dataset GEANT.

As illustrated in FIG. 1 and FIG. 2, dataset Abilene and dataset GEANT, which are used widely, may be quantitatively analyzed to reveal correlations among flows in embodiments of the disclosure. In detail, a Pearson correlation coefficient (r for short) may be calculated for any two flows; furthermore, for any flow, the number of flows that are strongly correlated with this any flow (r coefficient>0.6) may be counted. As illustrated in FIG. 1 and FIG. 2, the abscissa is the number of strongly correlated flows, and the ordinate is the complementary cumulative distribution rate (CCDF). It may be known from the two figures that: for the set GEANT of traffic matrices, 58.2% of the flows have at least one strongly correlated flow, and 40.8% of the flows have at least 20 strongly correlated flows; and for the set Abilene of traffic matrices, 43.1% of the flows have at least one strongly correlated flow, and 20.8% of the flows have at least 5 strongly correlated flows, and even some flows have more than 80 strongly correlated flows. Therefore, these data show that, on the one hand, there may be strong correlations among flows in the traffic matrix; on the other hand, when predicting a flow (that is, predicting the traffic matrix), it may effectively improve an accuracy of prediction results by considering historical values of flows correlated to this flow.

Figure 3:
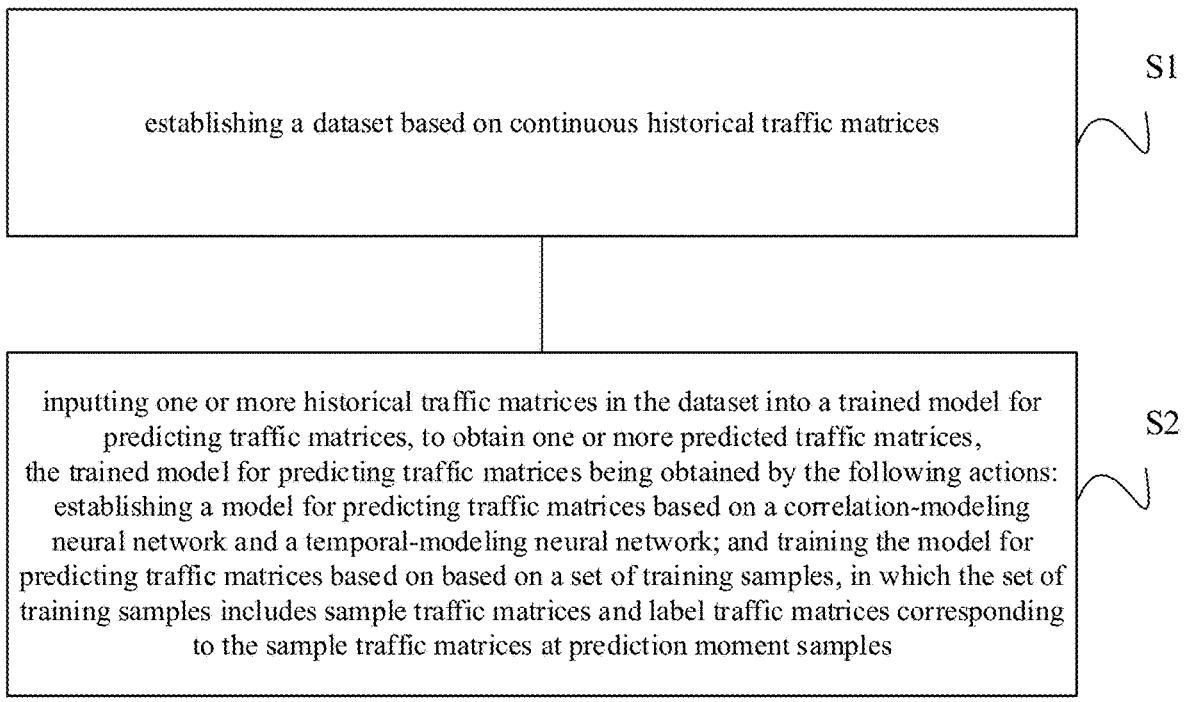
FIG. 3 is a flowchart of a method for predicting a traffic matrix according to embodiments of the disclosure.

In view of this, embodiments of the disclosure provide a method for predicting a traffic matrix. As illustrated in FIG. 3, the method may include the following.

At block S1, a dataset is established based on continuous historical traffic matrices.

At block S2, one or more historical traffic matrices in the dataset are inputted into a trained model for predicting traffic matrices, to obtain one or more predicted traffic matrices.

The trained model for predicting traffic matrices is obtained by the following actions.

A model for predicting traffic matrices is established based on a correlation-modeling neural network and a temporal-modeling neural network.

The model for predicting traffic matrices is trained based on set of training samples, in which the set of training samples may include sample traffic matrices and label traffic matrices corresponding to the sample traffic matrices at prediction moment samples. Many historical traffic matrices in a long period of time may be collected, and the collected historical traffic matrices may be divided into sample traffic matrices and label traffic matrices corresponding to the continuous sample traffic matrices at prediction moment samples, to form the set of training samples. For example, the historical traffic matrices at moments 1 to 10 are taken as the sample traffic matrices, and the historical traffic matrix at moment 11 next to the moment 10 is taken as the label traffic matrix.

The traffic matrices have a very important position in the traffic engineering. The historical traffic matrices accurately obtained may be essential for the prediction of traffic demands. However, although it is feasible to directly measure and record the traffic matrices, it will consume a lot of network resources and consume a lot of manpower and material resources. At block S1 of the embodiments of the disclosure, the traffic matrices may be inferred through reasonable modeling through prior information such as measurement data and routing information of limited links. Since there are relatively mature research on how to obtain the historical traffic matrices, the embodiments of the disclosure do not specifically limit this.

Furthermore, in the embodiments of the disclosure, a part of the collected historical traffic matrices may be used to establish a dataset. All historical traffic matrices may be sorted in chronological order. The dataset may be divided into a training set and a test set, according to a preset ratio (such as 8:2). The training set is configured to train the established model. The test set is configured for testing on the trained model.

In detail, before training the model for predicting traffic matrices, a real traffic matrix corresponding to each historical traffic matrix in the set of training data is obtained, to establish a training label. Each historical traffic matrix may be inputted into the model for predicting traffic matrices in turn, and the corresponding label is used to test the prediction result, and the parameters of the model for predicting traffic matrices may be adjusted according to a deviation between the predicted value and the label. The above training process is performed multiple iterations until the deviation between the predicted value and the true value is approximately unchanged.

In order to make the established model for predicting traffic matrices contain both the correlations among the flows and the temporality of the flows themselves (intra-flow variability), embodiments of the disclosure provide a model for predicting traffic matrices, and the correlation-modeling neural network and the temporal-modeling neural network may be unified in this model. The temporality of the flows themselves and the correlations among the flows are comprehensively considered. By modeling the nonlinear relationships in the historical traffic data, the prediction accuracy is effectively improved.

Based on the content of the foregoing embodiments, in embodiments of the disclosure, the correlation-modeling neural network is a convolutional neural network (CNN), and the temporal-modeling neural network is a long-short-term memory network (LSTM).

Figure 4:
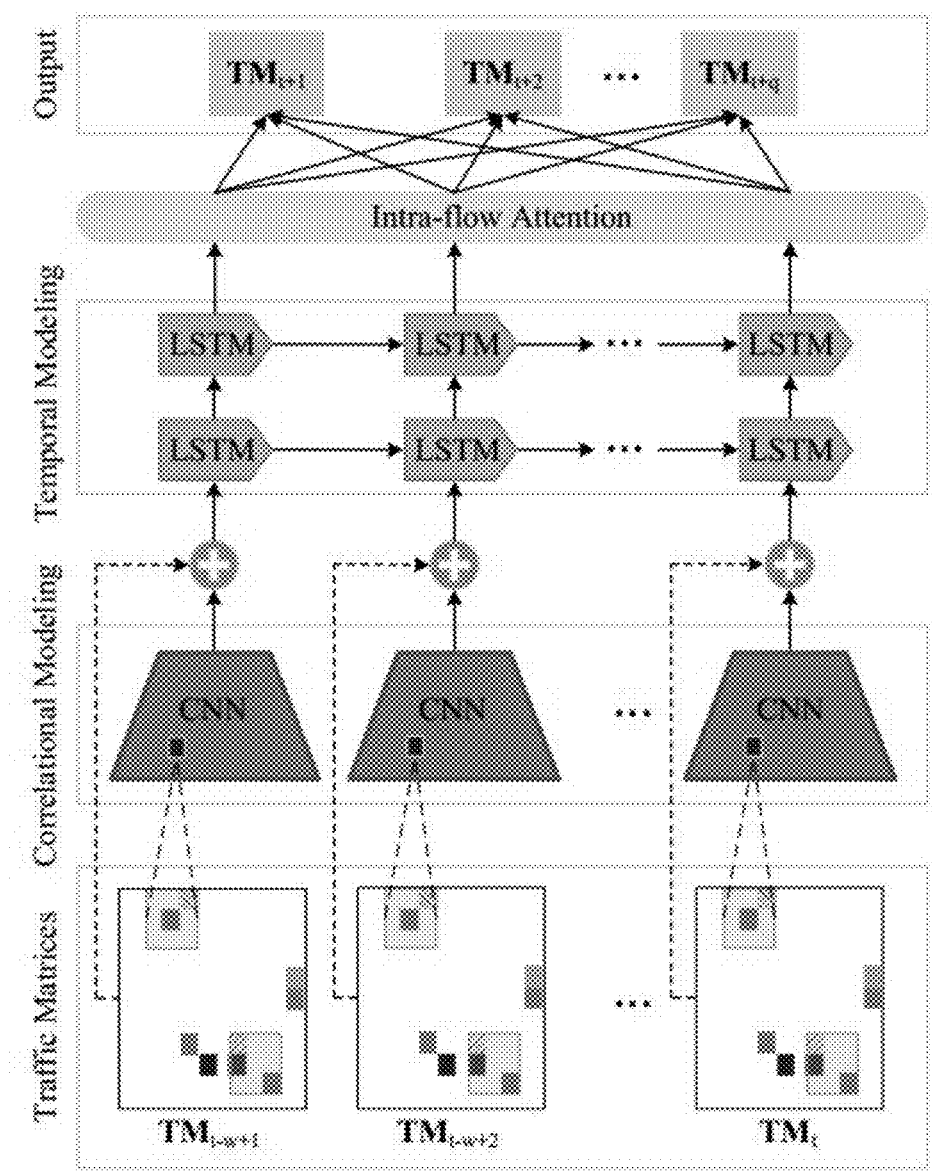
FIG. 4 is a schematic diagram of a model for predicting traffic matrices according to embodiments of the disclosure.

In detail, FIG. 4 is a schematic diagram of a model for predicting traffic matrices in a method for predicting a traffic matrix according to embodiments of the disclosure. As illustrated in FIG. 4, the model for predicting traffic matrices may include two parts: a part of convolutional neural network and a part of long-short-term memory network, i.e., the correlational modeling part (Correlational Modeling in FIG. 4) and the temporal modeling part (Temporal Modeling in FIG. 4). In the correlational modeling part, the parameters of the convolutional neural network are convolved with the input W historical traffic matrices (Traffic Matrices, referred to as $TM_t$) respectively, to obtain an intermediate implicit vector (i.e. a correlation matrix), and each value in the correlation matrix describes the comprehensive impact of other flows on the current flow.

In the process of obtaining the correlation matrix, a nonlinear activation function may be introduced in order to increase the nonlinearity of the neural network model. Without the participation of the nonlinear activation function, each layer of the obtained correlation function is equivalent to the result of matrix multiplication. Even after stacking several layers, it is nothing more than matrix multiplication. The nonlinear activation function may be introduced to learn the nonlinear relationships among historical traffic matrices. The nonlinear activation function may be one of Sigmoid function, Tan h function, ReLU (Rectified Linear Unit) function, or Leaky ReLU (Leaky Rectified Linear Unit) function, which is not specifically limited in the embodiments of the disclosure.

Further, in the temporal modeling part, the historical traffic matrix originally inputted into the convolutional neural network and the corresponding correlation matrix obtained in the correlational modeling part are combined, and then inputted into the long-short-term memory network (LSTM) to obtain the output of the LSTM model, i.e., q predicted traffic matrices ($TM_{t+1}$–$TM_{t+q}$).

In conclusion, the predicted traffic matrices ($TM_{t+1}$–$TM_{t+q}$) may be: by inputting the historical traffic matrices ($TM_{W-t+t}$–$TM_t$) at W moments into the trained model for predicting traffic matrices to obtain future q traffic matrices.

Figure 5:
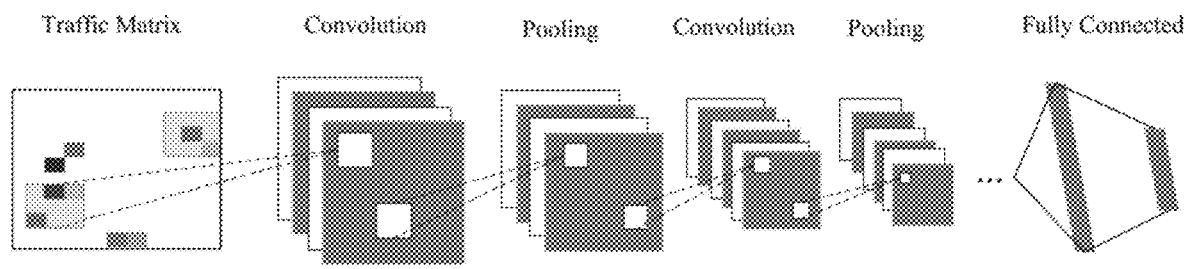
FIG. 5 is a schematic diagram of a correlation-modeling process of a convolution neural network in a method for predicting a traffic matrix according to embodiments of the disclosure.

FIG. 5 is a schematic diagram of a convolution process of a convolutional neural network (CNN) in a method for predicting a traffic matrix according to embodiments of the disclosure. As illustrated in FIG. 5, at a moment t, the historical traffic matrix $TM_t$ is inputted into the convolutional neural network. The output of the $k^{th}$ convolution kernel of the $l^{th}$ layer is denoted by formulas of:

$$X_l^k = \sigma\left[\sum_{j=1}^{C_{l-1}} \left(W_l^{jk} * X_{l-1}^j + b_l^k\right)\right], \text{ and } Y_l^k = \sigma[\beta_l^k \text{down}(Y_{l-1}^k) + b_l^k],$$

where, the historical traffic matrix $TM_t$ is inputted into the $0^{th}$ layer, $W_l^k$ represents a weight of a convolution kernel, $b_l^k$ represents a bias parameter of the convolution kernel,

* represents a convolution operation,

σ represents a nonlinear activation function, $C_{l-1}$ represents the number of convolution kernels of the $(l-1)^{th}$ layer, β represents a parameter of a pooling layer, down represents a downsampling function in the pooling, $X_l^k$ represents an output function of the convolutional layer, and $Y_l^k$ represents an output function of the pooling layer.

After $TM_t$ is processed by all convolutional layers and pooling layers, and then is processed by the fully connected layer. Finally, the inter-flow correlation output by the CNN network and $TM_t$ are combined into a vector and sent to the temporal modeling module.

The traffic on the WAN (Wide Area Network) has significant temporal regularity. The historical traffic state may have a long-term impact on the current traffic state. The Recurrent Neural Network (RNN) is a tool widely used in time series data modeling, such as natural language processing and time series predicting. However, because RNN has the problem of gradient explosion and disappearance, it is not suitable for sudden and long-term traffic prediction. Because LSTM introduces a memory unit to learn whether to forget the previous hidden state, and update the hidden state to avoid the above-mentioned deficiencies of RNN. Therefore, in the embodiments of the disclosure, the LSTM layer is introduced as the key module of predicting the traffic matrices.

Figure 6:
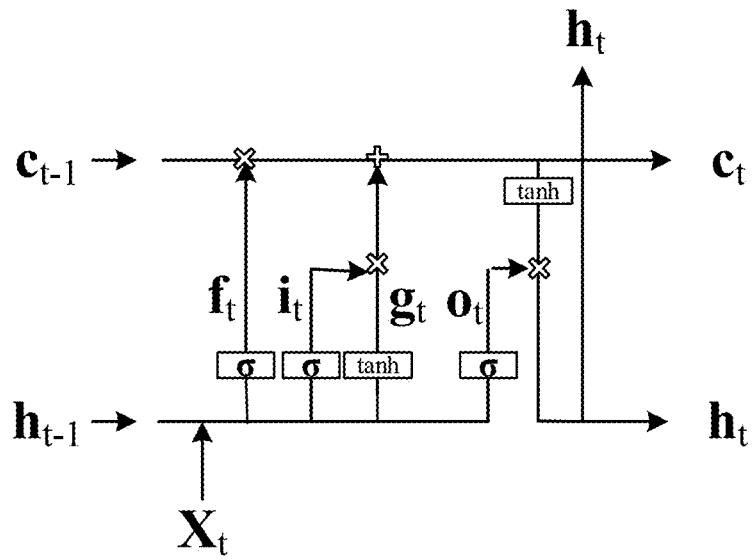
FIG. 6 is a schematic diagram of an internal structure of each neuron in each layer of a long-short-term memory network (LSTM) in a method for predicting a traffic matrix according to embodiments of the disclosure.

FIG. 6 is a schematic diagram of an internal structure of each neuron in each layer of a long-short-term memory network (LSTM) in a method for predicting a traffic matrix according to embodiments of the disclosure. As illustrated in FIG. 6, each LSTM unit includes a single memory unit (c), a unit input ($g_t$), a unit output ($h_t$), an input gate ($i_t$), an output gate ($o_t$), and a forget gate ($f_t$). The memory unit is configured to combine the previous unit state, the current input and the previous output to update the hidden state. The forget gate is configured to decide whether information should be forgotten or remembered. The output gate is configured to determine how the storage unit should affect the hidden state. The time regularity of the flows may be calculated iteratively according to the following formulas of:

$$i_t = \sigma(W_x^i X_t + W_h^i h_{t-1} + b_i)$$

$$f_t = \sigma(W_x^f X_t + W_h^f h_{t-1} + b_f)$$

$$o_t = \sigma(W_x^o X_t + W_h^o h_{t-1} + b_o)$$

$$g_t = \tan h(W_x^c X_t + W_h^c h_{t-1} + b_c)$$

$$c_t = f_t \odot c_{t-1} + i_t \odot g_t$$

$$h_t = o_t \odot \tan h(c_t)$$

where, $X_t$ represents an input at a moment t, $h_{t-1}$ represents a hidden state at a previous moment, $W_x^i$, $W_x^f$, $W_x^o$, and $W_x^c$ represent weight parameters of the three gates and the input unit connected to $X_t$, $W_h^i$, $W_h^f$, $W_h^o$, and $W_h^c$ represent weight parameters of the three gates and the input unit connected to $h_{t-1}$, $b_i$, $b_f$, $b_o$, and $b_c$ represent corresponding bias parameters, σ represents an activation function, tan h represents a hyperbolic tangent activation function, Θ represents a dot product between vectors.

For the LSTM unit in the LSTM layer 1, $X_t$ includes the historical traffic matrix $TM_t$ and the corresponding correlation matrix, or $X_t$ is the unit output of the previous LSTM layer.

Based on the content of the foregoing embodiments, in embodiments of the disclosure, inputting the one or more historical traffic matrices in the dataset into the trained model for predicting traffic matrices to obtain the one or more predicted traffic matrices, includes: inputting continuous W historical traffic matrices in the dataset into the trained model for predicting traffic matrices to obtain continuous q predicted traffic matrices.

In detail, as illustrated in FIG. 4, when there are historical traffic matrices, i.e., $TM_{t-w+1}$, $TM_{t-w+2}$ ... $TM_t$, and a total W of historical traffic matrices. All W historical traffic matrices are inputted into the model for predicting traffic matrices sequentially in time, to obtain continuous q predicted traffic matrices in time. The method for predicting the traffic matrix, provided in embodiments of the disclosure, by inputting the continuous historical traffic matrices in turn to the model for predicting traffic matrices, may obtain the predicted traffic matrices in a continuous time period, which may effectively improve the applicability of prediction.

Based on the content of the foregoing embodiments, in embodiments of the disclosure, inputting the one or more historical traffic matrices in the dataset into the trained model for predicting traffic matrices to obtain the one or more predicted traffic matrices, includes: inputting the historical traffic matrix into the convolutional neural network to obtain a traffic-correlated matrix corresponding to the historical traffic matrix; combining the historical traffic matrix and the traffic-correlated matrix as a prediction vector; and inputting the prediction vector into the long-short-term memory network, to obtain the predicted traffic matrix.

Furthermore, inputting the prediction vector into the long-short-term memory network to obtain the predicted traffic matrix, includes: inputting the prediction vector into the long-short-term memory network to obtain an intermediate matrix outputted by the last memory layer of the long-short-term memory network; and performing an intra-flow attention mechanism operation on the intermediate matrix to output the predicted traffic matrix.

The intra-flow attention mechanism operation has a calculation formula of:

$$E_{i,j} = \sigma[V_1(HV_2)^T + b_e]$$

$$E'_{i,j} = \frac{\exp(E_{i,j})}{\sum_{k=1}^{W} \exp(E_{i,k})},$$

-continued $$TM_{t+1} = f(E_{i,j}', H)$$

where,

H represents the intermediate matrix, $V_1$ and $V_2$ represent learnable weights in the intra-flow attention mechanism operation, T represents a matrix transpose operation, σ represents a coefficient, $b_e$ represents a bias parameter, $E_{i,j}$ represents a strength matrix of dependence relationship between moment i and moment j in W moments, $E_{i,k}$ represents a strength matrix of dependence relationship between moment i and moment k in W moments, $E'_{i,j}$ represents a normalization of $E_{i,j}$ using a softmax function, exp represents an exponential function, f represents a matrix multiplication function, and TM represents a predicted traffic matrix corresponding to the intermediate matrix.

It should be noted that although the output of the long-short-term memory network is W traffic matrices, the first q of the W traffic matrices may be selected as the predicted traffic matrices according to the required prediction length q.

Figure 7:
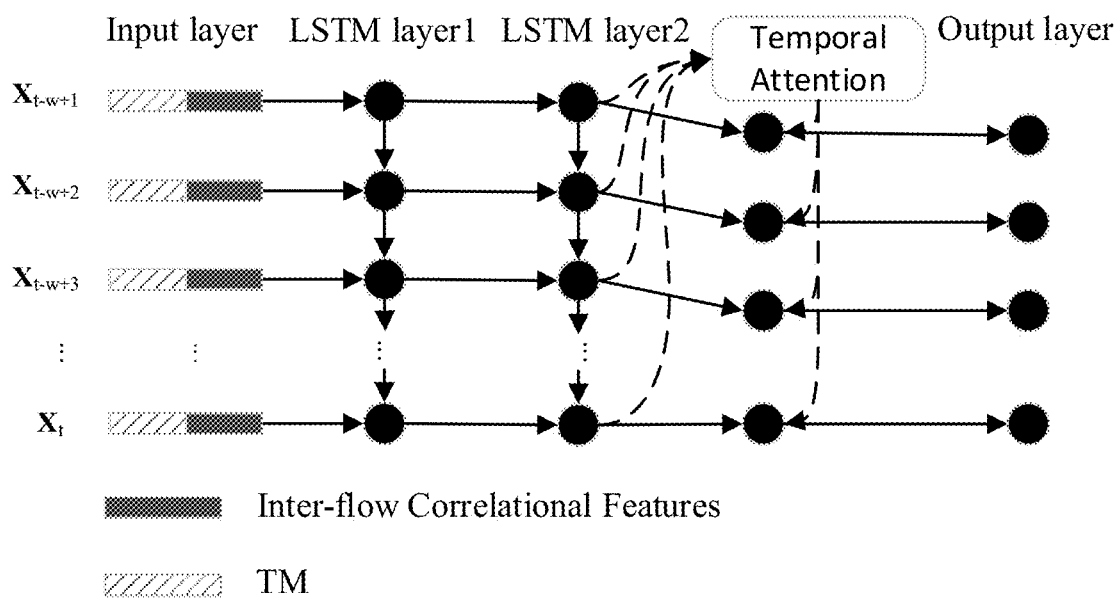
FIG. 7 is a schematic diagram of a temporal modeling process of a long-short-term memory network in a method for predicting a traffic matrix according to embodiments of the disclosure.

FIG. 7 is a schematic diagram of a temporal modeling process of a long-short-term memory network in a method for predicting a traffic matrix according to embodiments of the disclosure. As illustrated in FIG. 7, in embodiments of the disclosure, take the corresponding predicted traffic matrix being obtained through the historical traffic matrix $X_t$ as an example.

Because each LSTM unit in the long-short-term memory network extracts temporal features from the input, and outputs the hidden state as its only representation. However, on the one hand, due to a long period of traffic and a limited capacity of the cyclic encoder, some inputted information will inevitably be lost when obtaining the hidden state; on the other hand, due to the burstiness of the WAN traffic, adjacent extreme moments may confuse the long-short-term memory network, resulting in incorrect predictions.

In the embodiments, the weight of the intermediate matrix H outputted by the last layer of LSTM is made robust and accurate prediction adjustment, that is, the intensity matrix of the dependence relationship between time and traffic is established. The intensity matrix is normalized to generate an intra-flow attention matrix. The weight of the intermediate matrix H is dynamically adjusted through the intra-flow attention matrix, to obtain the result. Compared with the predicted traffic matrix that directly uses the intermediate matrix H, the above two shortcomings are effectively overcome.

Based on the content of the foregoing embodiments, in embodiments of the disclosure, before inputting the historical traffic matrix into the convolutional neural network, the method further includes: determining a number of convolutional layers in the convolutional neural network based on a size of the historical traffic matrix.

In order to model the correlation in the inputted historical traffic matrix, W traffic matrices in a test sample are respectively used as the input of the CNN model in the embodiments of the disclosure. One convolutional layer can only capture the correlation of adjacent elements in the matrix, and the distribution of correlated elements in the traffic matrix has the same line or same column rule. In order to capture the correlation of non-adjacent elements, in the embodiments, the correlation among flows may be modeled by using the CNN network with multiple convolutional layers. The larger the inputted historical traffic matrix, the more convolutional layers may be required.

Based on the content of the foregoing embodiments, in embodiments of the disclosure, training the model for predicting traffic matrices, includes the following.

S71, a plurality of continuous historical traffic matrices in the dataset may be arranged in sequence to establish a set of training samples.

S72, any one of the historical traffic matrices in the set of training samples may be inputted to the model for predicting traffic matrices, to obtain a predicted matrix output by the model for predicting traffic matrices.

S73, a difference between the predicted matrix and the real traffic matrix at the prediction moment may be obtained as a prediction error of this training.

S74, all parameters in the model for predicting traffic matrices may be updated based on the prediction error along a gradient direction, and the any one of the historical traffic matrices may be removed from the dataset.

S75, action S72 to action S74 may be iteratively executed in sequence until the prediction error tends to remain unchanged.

In detail, the method for training the established model for predicting traffic matrices (CRNN) in the embodiments of the disclosure may be an error back propagation algorithm in deep learning, that is, the sample at the input end and the label corresponding to the sample as the output end are used to complete the training of the model.

In detail, during the training phase, for each iteration, the difference between the final output $TM_{t+1}$ and the real traffic matrix $TM'_{t+1}$ at that moment is taken as the error of this iteration. This error is used to calculate gradients of all parameters in the model, such that each parameter may be updated along the gradient direction. Therefore, the output of the model will be closer to the real traffic matrix. After many iterations, the error of the model will eventually tend to remain unchanged, that is, it may be considered that the predictive ability of the model has converged to an optimal point.

Figure 8:
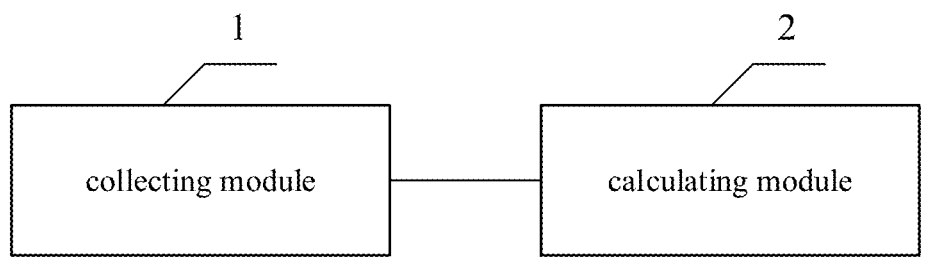
FIG. 8 is a block diagram of a system for predicting a traffic matrix according to embodiments of the disclosure.
Figure 9:
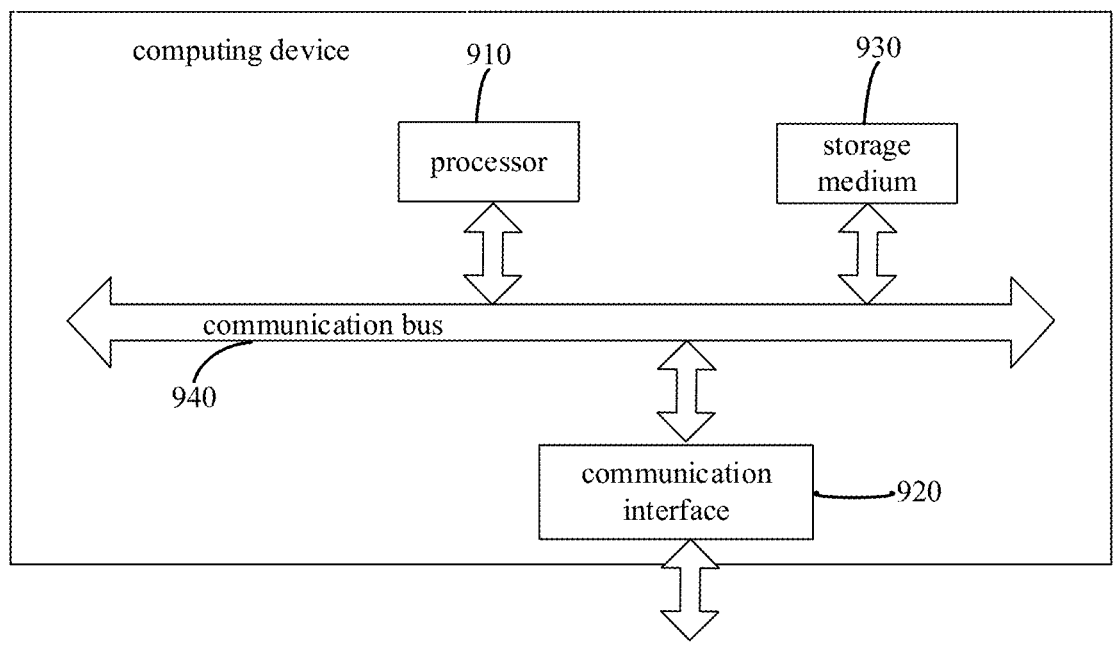
FIG. 9 is a block diagram of a computing device according to embodiments of the disclosure.

A system for predicting a traffic matrix, is also provided in embodiments of the disclosure. As illustrated in FIG. 8, the system includes a collecting module 1 and a calculating module 2. The collecting module 1 is configured to establish a dataset based on continuous historical traffic matrices. The calculating module 2 is for storing a trained model for predicting traffic matrices, and configured to receive one or more historical traffic matrices in the dataset, and input the one or more historical traffic matrices in the dataset into the trained model for predicting traffic matrices to obtain one or more predicted traffic matrices.

The trained model for predicting traffic matrices is obtained by the following actions: establishing a model for predicting traffic matrices based on a correlation-modeling neural network and a temporal-modeling neural network; and training the model for predicting traffic matrices based on training samples to obtain the trained model for predicting traffic matrices, in which the training samples include historical traffic matrix samples and real traffic matrix samples, the real traffic matrix samples are corresponding to the historical traffic matrix samples at prediction moment samples.

Furthermore, the correlation-modeling neural network is a convolutional neural network, and the temporal-modeling neural network is a long-short-term memory network.

The system for predicting the traffic matrix, provided in embodiments of the disclosure, may establish the model for predicting traffic matrices that integrates the convolutional neural network and the recurrent neural network, consider comprehensively the temporality of flows among nodes and the correlation among the flows, and model nonlinear relationships in historical traffic data, effectively improving detection accuracy.

Figure 10:
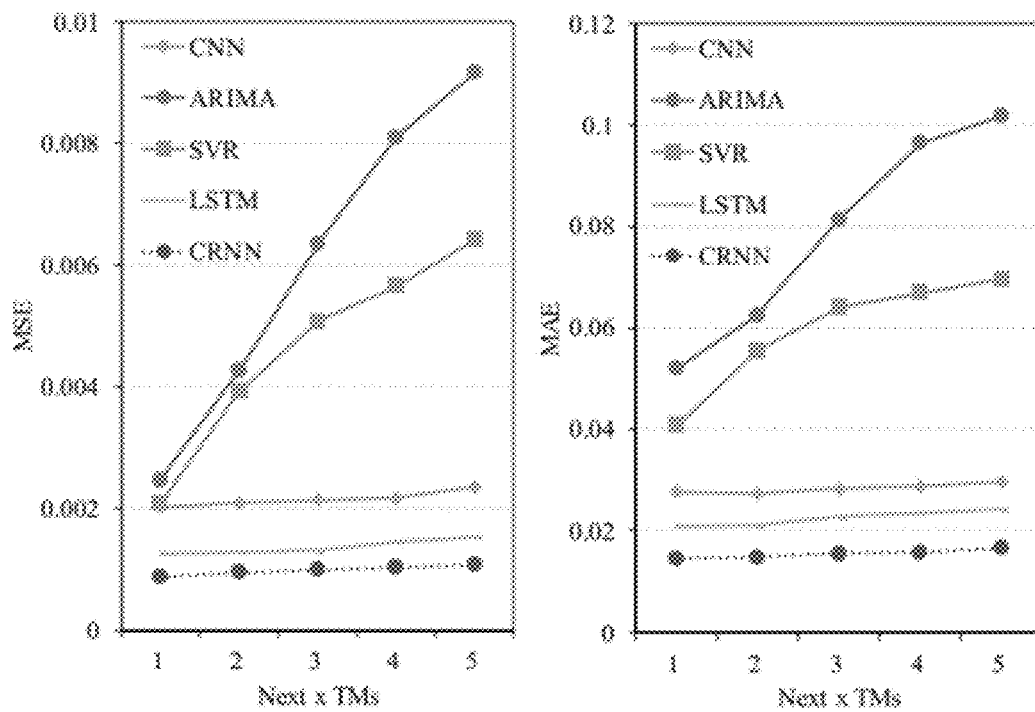
FIG. 10 is a schematic diagram of simulation and comparing of a model for predicting traffic matrices in embodiments of the disclosure and benchmark models by using dataset Abilene.

FIG. 10 is a block diagram of a computing device according to embodiments of the disclosure. As illustrated in FIG. 10, the computing device may include a processor 910, a communication interface 920, a storage medium 930, and a communication bus 940. The processor 910, the communication interface 920, and the storage medium 930 may communicate with each other through the communication bus 940. The processor 910 may call logic instructions from the storage medium 930, to carry out the following method: establishing a dataset based on continuous historical traffic matrices; and inputting one or more historical traffic matrices in the dataset into a trained model for predicting traffic matrices, to obtain one or more predicted traffic matrices. The trained model for predicting traffic matrices is obtained by the following actions: establishing a model for predicting traffic matrices based on a correlation-modeling neural network and a temporal-modeling neural network; and training the model for predicting traffic matrices based on historical traffic matrix samples and real traffic matrix labels at a prediction moment corresponding to the historical traffic matrix samples, to obtain the trained model for predicting traffic matrices.

The storage medium 930 is a non-transitory computer-readable storage medium according to the disclosure. The storage medium stores instructions executable by the processor 910, so that the processor 910 executes the method according to the disclosure. The non-transitory computer-readable storage medium according to the disclosure stores computer instructions that are configured to cause the computing device to execute the method according to the disclosure (the method as illustrated in FIG. 1).

As the non-transitory computer-readable storage medium, the storage medium 930 is configured to store non-transitory software programs, non-transitory computer executable programs and modules, such as program instructions/modules corresponding to the method of the disclosure (For example, the collecting module 1 and the calculating module 2). The processor 910 executes various functional applications and data processing by running non-transitory software programs, instructions, and modules stored in the storage medium 930, that is, implementing the method in the foregoing embodiment of FIG. 1.

The storage medium 930 may include a storage program area and a storage data area, where the storage program area may store an operating system and application programs required for at least one function. In addition, the storage medium 930 may include a high-speed random-access memory, and a non-transitory memory, such as at least one magnetic disk storage device, a flash memory device, or other non-transitory solid-state storage device. In some embodiments, the storage medium 930 may optionally include a storage medium remotely disposed with respect to the processor 910, and these remote memories may be connected to the computing device through a network. Examples of the above network include, but are not limited to, the Internet, an intranet, a local area network, a mobile communication network, and combinations thereof.

In addition, the above-mentioned logic instructions in the storage medium 930 may be implemented in a form of software functional units and sold or used as an independent product, which may be stored in a computer readable storage medium. Based on this understanding, technical solutions of the disclosure essentially, or the part that contributes to the existing technology, or the part of the technical solutions may be embodied in a form of software product. The software product is stored in a storage medium, including several instructions configured to make a computer device (which may be a personal computer, a server, or a network device, etc.) to execute all or part of the actions of the methods described in the various embodiments of the disclosure. The storage medium may include a U disk, a mobile hard disk, a read-only memory (ROM), a random-access memory (RAM), a magnetic disk, an optical disk, and other media that can store program codes.

A non-transitory computer-readable storage medium is also provided in embodiments of the disclosure. The non-transitory computer-readable storage medium stores computer instructions. The computer instructions may cause a computer to execute the methods provided in the foregoing method embodiments, for example, including: establishing a dataset based on continuous historical traffic matrices; and inputting one or more historical traffic matrices in the dataset into a trained model for predicting traffic matrices, to obtain one or more predicted traffic matrices. The trained model for predicting traffic matrices is obtained by the following actions: establishing a model for predicting traffic matrices based on a correlation-modeling neural network and a temporal-modeling neural network; and training the model for predicting traffic matrices based on historical traffic matrix samples and real traffic matrix labels at a prediction moment corresponding to the historical traffic matrix samples, to obtain the trained model for predicting traffic matrices.

Figure 11:
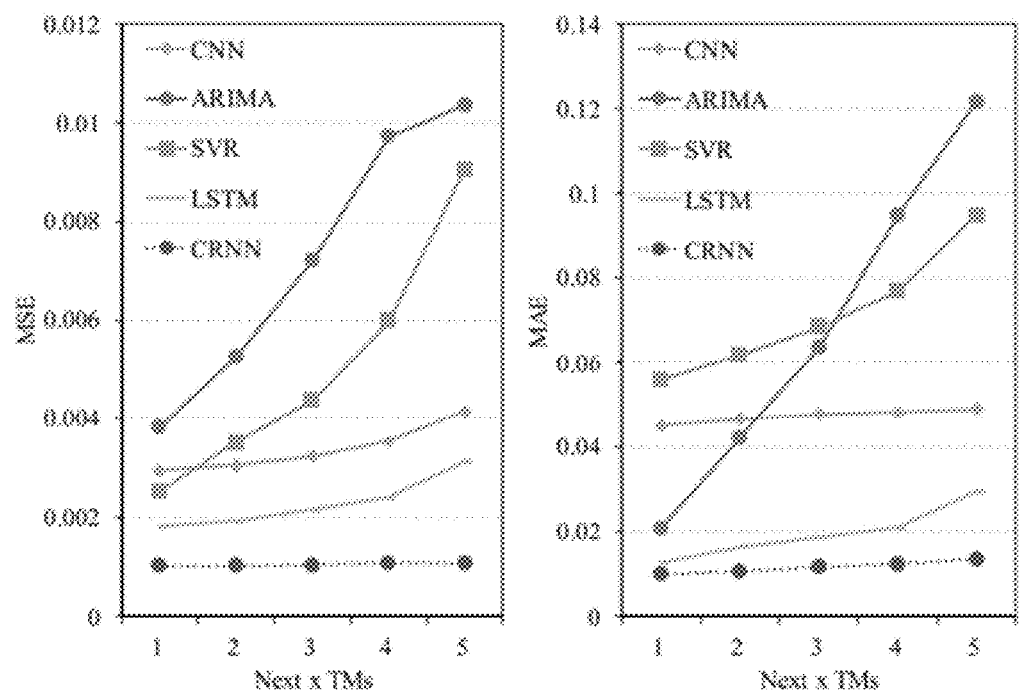
FIG. 11 is a schematic diagram of simulation and comparing of a model for predicting traffic matrices in embodiments of the disclosure and benchmark models by using dataset GEANT.

In order to further confirm that the method and system for predicting the traffic matrix provided in the embodiments of the disclosure are more accurate than other network models in the related art, description is illustrated in conjunction with FIG. 10 and FIG. 11.

FIG. 10 is a schematic diagram of simulation and comparing of a model for predicting traffic matrices in embodiments of the disclosure and benchmark models by using dataset Abilene. FIG. 11 is a schematic diagram of simulation and comparing of a model for predicting traffic matrices in embodiments of the disclosure and benchmark models by using dataset GEANT.

In the figures, the abscissa is the predicted number of the traffic matrices. MSE in the ordinate represents the mean square error. MAE in the ordinate represents the mean absolute error.

It may be clearly seen in FIG. 10 and FIG. 11 provided by the embodiments of the disclosure that, by increasing the number of predicted matrices (q) from 1 to 5, as the prediction interval increases, the prediction difficulty also increases, and the prediction error increases accordingly. Specifically, the long-term prediction performance of ARIMA and SVR is much worse than the corresponding short-term prediction. The error of CNN increases slowly as the prediction interval increases, and the overall performance is good. Although the error of CNN has not changed much, the prediction accuracy of CNN has been very low because it cannot model the correlations among flows.

The CRNN model provided by the embodiments of the disclosure may obtain the best prediction performance. Especially in the long-term prediction, the difference between CRNN and other benchmark models is more significant. Taking q=5 as an example, compared with LSTM, the MAE of CRNN for Abilene and GEANT was reduced by 31.5% and 54.7%, and the MAE for Abilene and GEANT was reduced by 29.7% and 65.9%, respectively. These results fully show that the strategy of combining CNN and RNN may better dig out the dynamic change law of TMs, and obtain the more accurate predicted traffic matrices.

The device embodiments described above are merely illustrative. The units described as separate components may or may not be physically separated, and the components displayed as units may or may not be physical units. That is, they may be in one place, or be distributed to multiple network units. Some or all the modules may be selected according to actual needs to achieve the objectives of the solutions of the embodiments. Those of ordinary skill in the art may understand and implement the embodiments of the disclosure without creative work.

Various embodiments and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

It should be understood that the various forms of processes shown above can be used to reorder, add, or delete steps. For example, the steps described in this disclosure can be executed in parallel, sequentially, or in different orders, as long as the desired results of the technical solutions disclosed in this disclosure can be achieved, which is no limited herein.

The foregoing specific implementations do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of this disclosure shall be included in the protection scope of this disclosure.

What is claimed is:

1. A method for predicting a traffic matrix, comprising:
establishing a dataset based on continuous historical traffic matrices; and
inputting one or more historical traffic matrices in the dataset into a trained model for predicting traffic matrices, to obtain one or more predicted traffic matrices,
the trained model for predicting traffic matrices being obtained by the following actions:
establishing a model for predicting traffic matrices based on a convolutional neural network (CNN) and a long-short-term memory (LSTM) network; and
training the model for predicting traffic matrices based on a set of training samples, in which the set of training samples includes sample traffic matrices and label traffic matrices corresponding to the sample traffic matrices at prediction moment;
wherein, inputting the one or more historical traffic matrices in the dataset into the trained model for predicting traffic matrices to obtain the one or more predicted traffic matrices, comprises:
inputting the historical traffic matrix into the CNN to obtain a traffic-correlated matrix corresponding to the historical traffic matrix;
combining the historical traffic matrix and the traffic-correlated matrix as a prediction vector;
inputting the prediction vector into the LSTM network to obtain an intermediate matrix outputted by the last LSTM layer in the LSTM network, and
performing an intra-flow attention mechanism operation on the intermediate matrix at the last LSTM layer, to output the predicted traffic matrix,
wherein, the intra-flow attention mechanism operation has a calculation formula of:

$$E_{i,j} = \sigma[V_1(HV_2)^T + b_e]$$
$$E'_{i,j} = \frac{\exp(E_{i,j})}{\sum_{k=1}^{W} \exp(E_{i,k})},$$
$$TM_{t+1} = f(E_{i,j}', H)$$

where,
H represents the intermediate matrix,
$V_1$ and $V_2$ represent learnable weights in the intra-flow attention mechanism operation,
T represents a matrix transpose operation,
σ represents a coefficient,
$b_e$ represents a bias parameter,
$E_{i,j}$ represents a strength matrix of dependence relationship between moment i and moment j in W moments,
$E_{i,k}$ represents a strength matrix of dependence relationship between moment i and moment k in W moments,
$E'_{i,j}$ represents a normalization of $E_{i,j}$ using a softmax function,
exp represents an exponential function,
ƒ represents a matrix multiplication function, and
TM represents a predicted traffic matrix corresponding to the intermediate matrix;

wherein a nonlinear activation function is introduced to an output function of each convolutional layer and an output function of each pooling layer in the convolutional neural network in the process of obtaining the traffic-correlated matrix.

2. The method as claimed in claim 1, wherein, inputting the one or more historical traffic matrices in the dataset into the trained model for predicting traffic matrices to obtain the one or more predicted traffic matrices, comprises:
inputting continuous W historical traffic matrices in the dataset into the trained model for predicting traffic matrices to obtain continuous q predicted traffic matrices, where q is less than or equal to W.

3. The method as claimed in claim 1, further comprising: determining a number of convolutional layers in the convolutional neural network based on a size of the historical traffic matrix.

4. The method as claimed in claim 1, wherein training the model for predicting traffic matrices, comprises:
S71, arranging a plurality of continuous historical traffic matrices in the dataset in sequence to establish the set of training samples;
S72, inputting any one of the historical traffic matrices in the set of training samples to the model for predicting traffic matrices, to obtain a predicted matrix output by the model for predicting traffic matrices;
S73, obtaining a difference between the predicted matrix and the real traffic matrix at the prediction moment as a prediction error of this training;
S74, updating all parameters in the model for predicting traffic matrices based on the prediction error along a gradient direction, and removing the any one of the historical traffic matrices from the dataset; and
S75, iteratively executing action S72 to action S74 in sequence until the prediction error tends to remain unchanged.

5. A computing device, comprising:
a storage medium;
a processor; and
a computer program stored on the storage medium and capable of running on the processor,
wherein the processor is configured to, when executing the program, carry out:
establishing a dataset based on continuous historical traffic matrices; and
inputting one or more historical traffic matrices in the dataset into a trained model for predicting traffic matrices, to obtain one or more predicted traffic matrices,
the trained model for predicting traffic matrices being obtained by the following actions:
establishing a model for predicting traffic matrices based on a convolutional neural network (CNN) and a long-short-term memory (LSTM) network; and
training the model for predicting traffic matrices based on a set of training samples, in which the set of training samples includes sample traffic matrices and label traffic matrices corresponding to the sample traffic matrices at prediction moment;
wherein, inputting the one or more historical traffic matrices in the dataset into the trained model for predicting traffic matrices to obtain the one or more predicted traffic matrices, comprises:
inputting the historical traffic matrix into the CNN to obtain a traffic-correlated matrix corresponding to the historical traffic matrix;
combining the historical traffic matrix and the traffic-correlated matrix as a prediction vector;
inputting the prediction vector into the LSTM network to obtain an intermediate matrix outputted by the last LSTM layer in the LSTM network; and
performing an intra-flow attention mechanism operation on the intermediate matrix at the last LSTM layer, to output the predicted traffic matrix,
wherein, the intra-flow attention mechanism operation has a calculation formula of:

$$E_{i,j} = \sigma[V_1(HV_2)^T + b_e]$$

$$E'_{i,j} = \frac{\exp(E_{i,j})}{\sum_{k=1}^{W} \exp(E_{i,k})},$$

$$TM_{t+1} = f(E_{i,j}', H)$$

where,
H represents the intermediate matrix,
$V_1$ and $V_2$ represent learnable weights in the intra-flow attention mechanism operation,
T represents a matrix transpose operation,
σ represents a coefficient,
$b_e$ represents a bias parameter,
$E_{i,j}$ represents a strength matrix of dependence relationship between moment i and moment j in W moments,
$E_{i,k}$ represents a strength matrix of dependence relationship between moment i and moment k in W moments,
$E'_{i,j}$ represents a normalization of $E_{i,j}$ using a softmax function,
exp represents an exponential function,
ƒ represents a matrix multiplication function, and
TM represents a predicted traffic matrix corresponding to the intermediate matrix;
wherein a nonlinear activation function is introduced to an output function of each convolutional layer and an output function of each pooling layer in the convolutional neural network in the process of obtaining the traffic-correlated matrix.

6. The computing device as claimed in claim 5, wherein, inputting the one or more historical traffic matrices in the dataset into the trained model for predicting traffic matrices to obtain the one or more predicted traffic matrices, comprises:
inputting continuous W historical traffic matrices in the dataset into the trained model for predicting traffic matrices to obtain continuous q predicted traffic matrices, where q is less than or equal to W.

7. The computing device as claimed in claim 5, wherein the processor is further configured to, when executing the program, carry out:
determining a number of convolutional layers in the convolutional neural network based on a size of the historical traffic matrix.

8. The computing device as claimed in claim 5, wherein training the model for predicting traffic matrices, comprises:
S71, arranging a plurality of continuous historical traffic matrices in the dataset in sequence to establish the set of training samples;
S72, inputting any one of the historical traffic matrices in the set of training samples to the model for predicting traffic matrices, to obtain a predicted matrix output by the model for predicting traffic matrices;

S73, obtaining a difference between the predicted matrix and the real traffic matrix at the prediction moment as a prediction error of this training;

S74, updating all parameters in the model for predicting traffic matrices based on the prediction error along a gradient direction, and removing the any one of the historical traffic matrices from the dataset; and S75, iteratively executing action S72 to action S74 in sequence until the prediction error tends to remain unchanged.

9. A non-transitory computer-readable storage medium having stored therein instructions that, when executed by a processor of a computer, causes the computer to perform a method for adjusting traffic for a network, the method comprising:
establishing a dataset based on continuous historical traffic matrices; and
inputting one or more historical traffic matrices in the dataset into a trained model for predicting traffic matrices, to obtain one or more predicted traffic matrices,
the trained model for predicting traffic matrices being obtained by the following actions:
establishing a model for predicting traffic matrices based on a convolutional neural network (CNN) and a long-short-term memory (LSTM) network; and
training the model for predicting traffic matrices based on a set of training samples, in which the set of training samples includes sample traffic matrices and label traffic matrices corresponding to the sample traffic matrices at prediction moment;
wherein, inputting the one or more historical traffic matrices in the dataset into the trained model for predicting traffic matrices to obtain the one or more predicted traffic matrices, comprises:
inputting the historical traffic matrix into the CNN to obtain a traffic-correlated matrix corresponding to the historical traffic matrix;
combining the historical traffic matrix and the traffic-correlated matrix as a prediction vector;
inputting the prediction vector into the LSTM network to obtain an intermediate matrix outputted by the last LSTM layer in the LSTM network; and
performing an intra-flow attention mechanism operation on the intermediate matrix at the last LSTM layer, to output the predicted traffic matrix,
wherein, the intra-flow attention mechanism operation has a calculation formula of:

$$E_{i,j} = \sigma[V_1(HV_2)^T + b_e]$$

$$E'_{i,j} = \frac{\exp(E_{i,j})}{\sum_{k=1}^{W} \exp(E_{i,k})},$$

$$TM_{t+1} = f(E_{i,j}', H)$$

where,
H represents the intermediate matrix,
$V_1$ and $V_2$ represent learnable weights in the intra-flow attention mechanism operation,
T represents a matrix transpose operation,
$\sigma$ represents a coefficient,
$b_e$ represents a bias parameter,
$E_{i,j}$ represents a strength matrix of dependence relationship between moment i and moment j in W moments,
$E_{i,k}$ represents a strength matrix of dependence relationship between moment i and moment k in W moments,
$E'_{i,j}$ represents a normalization of $E_{i,j}$ using a softmax function,
exp represents an exponential function,
f represents a matrix multiplication function, and
TM represents a predicted traffic matrix corresponding to the intermediate matrix;
wherein a nonlinear activation function is introduced to an output function of each convolutional layer and an output function of each pooling layer in the convolutional neural network in the process of obtaining the traffic-correlated matrix.

10. The non-transitory computer-readable storage medium as claimed in claim 9, wherein, inputting the one or more historical traffic matrices in the dataset into the trained model for predicting traffic matrices to obtain the one or more predicted traffic matrices, comprises:
inputting continuous W historical traffic matrices in the dataset into the trained model for predicting traffic matrices to obtain continuous q predicted traffic matrices, where q is less than or equal to W.

11. The non-transitory computer-readable storage medium as claimed in claim 9, wherein training the model for predicting traffic matrices, comprises:
S71, arranging a plurality of continuous historical traffic matrices in the dataset in sequence to establish the set of training samples;
S72, inputting any one of the historical traffic matrices in the set of training samples to the model for predicting traffic matrices, to obtain a predicted matrix output by the model for predicting traffic matrices;
S73, obtaining a difference between the predicted matrix and the real traffic matrix at the prediction moment as a prediction error of this training;
S74, updating all parameters in the model for predicting traffic matrices based on the prediction error along a gradient direction, and removing the any one of the historical traffic matrices from the dataset; and
S75, iteratively executing action S72 to action S74 in sequence until the prediction error tends to remain unchanged.

* * * * *